April 26, 1955
A. THAON
2,706,943
MACHINES FOR DELIVERING TICKETS BEARING VARIABLE INSCRIPTIONS
Filed April 4, 1950
4 Sheets-Sheet 1
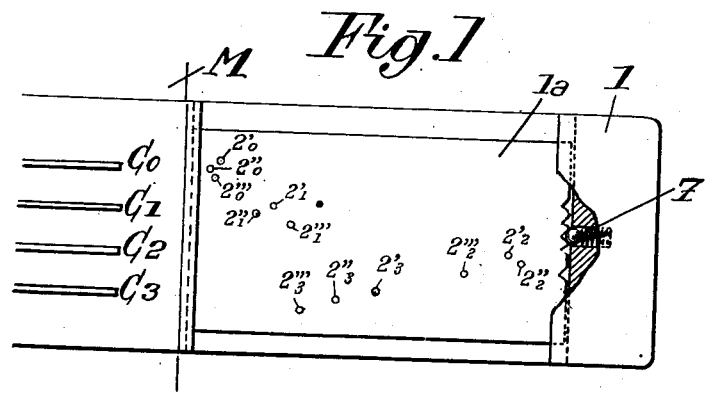
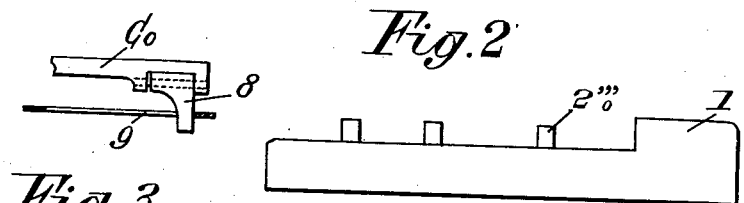
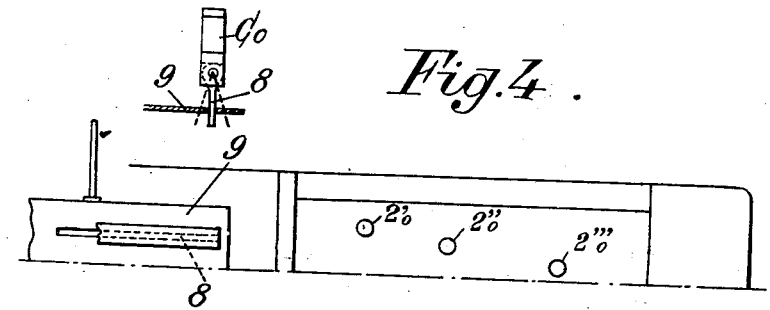
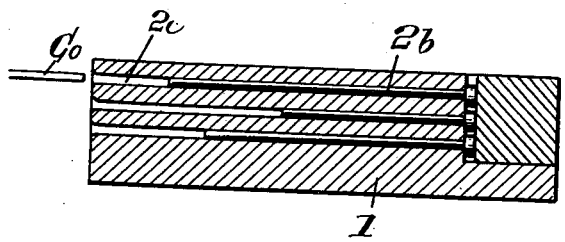
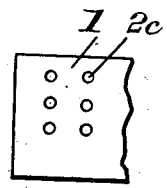
INVENTOR
ANDRE THAON
BY Roberts B Larson
ATTORNEY April 26, 1955
A. THAON
2,706,943
MACHINES FOR DELIVERING TICKETS BEARING VARIABLE INSCRIPTIONS
Filed April 4, 1950
4 Sheets-Sheet 2
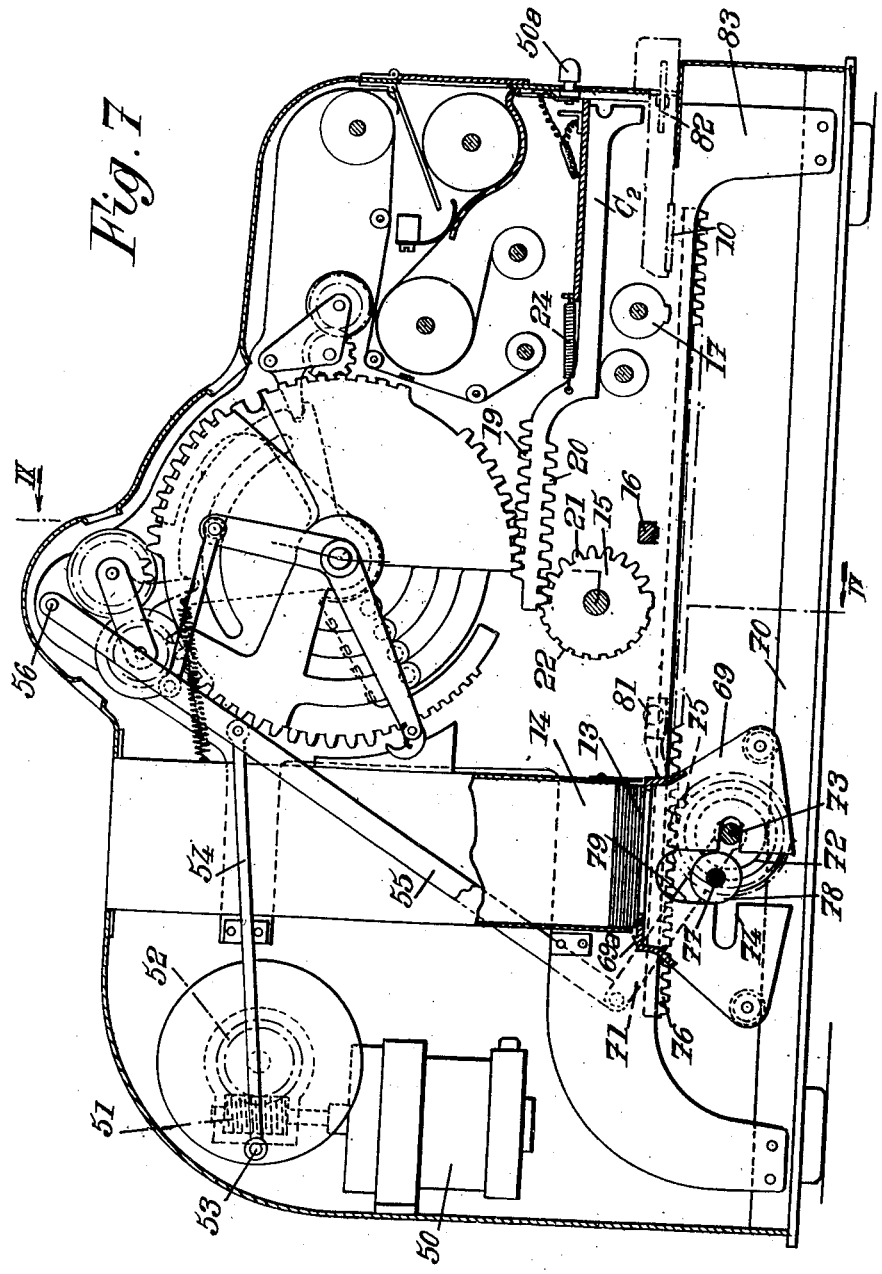
INVENTOR
ANDRE THAON
BY Roberts B Larson
ATTORNEY

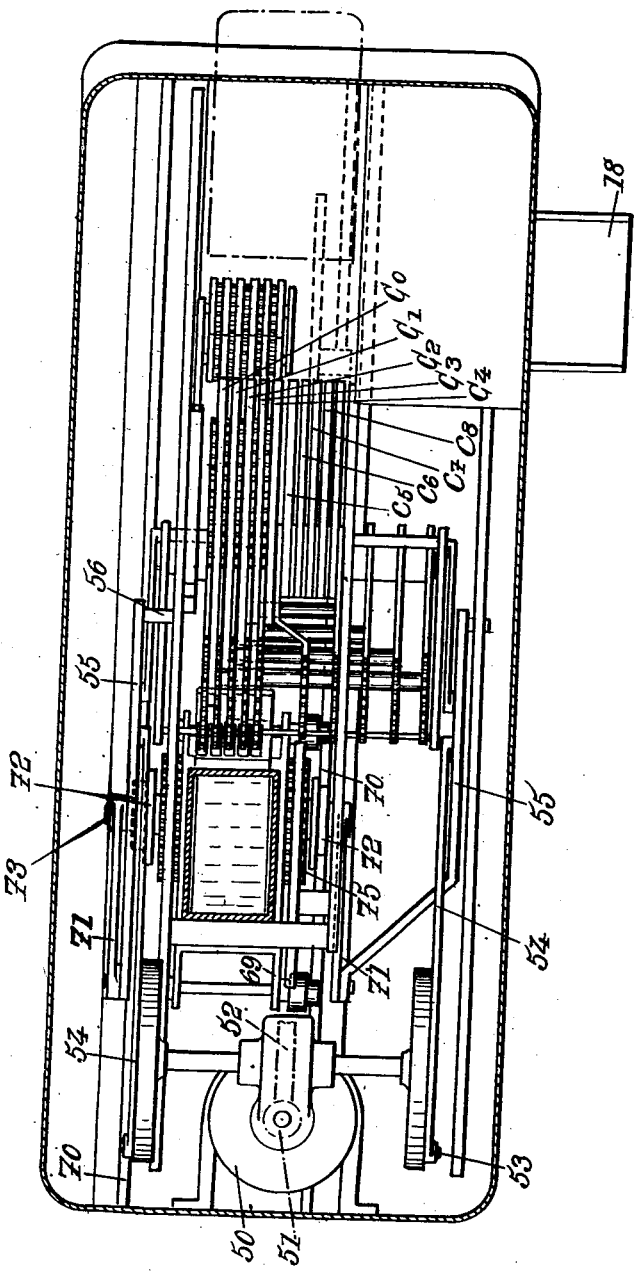

INVENTOR
ANDRE THAON
BY Robert B Larson
ATTORNEY

United States Patent Office 2,706,943
Patented Apr. 26, 1955

2,706,943
MACHINES FOR DELIVERING TICKETS BEARING VARIABLE INSCRIPTIONS

André Thaon, Montreux-Clarens, Switzerland, assignor to Compagnie des Machines Syntegra, Monaco, Principality of Monaco Application April 4, 1950, Serial No. 153,966
Claims priority, application Luxemburg April 13, 1949
5 Claims. (Cl. 101—69)

The present invention relates to machines for delivering tickets on which is to be printed information dependent upon at least one basic factor, for instance, the distance, and at least one variable, for instance, the class (first-class ticket, second-class ticket, etc.).

There are machines of this kind which make use of operating blocks. These operating blocks are inserted in the machines and are provided with abutments which adjust said printing means into the desired position. But in such machines it is necessary to provide a distinct operating block for every combination of the basic factor or factors, and the variable or variables.

The object of the present invention is to provide a machine of this type which requires a smaller number of operating blocks to perform the same ticket delivering operations.

For this purpose, according to my invention every operating block has at least two sets abutments thereon and adjustment means are provided for making only one of these sets operative whereby, when using an operating block characteristic of a given value of the basic factor, the variable can be given one of at least two different possible values.

Figure 9:
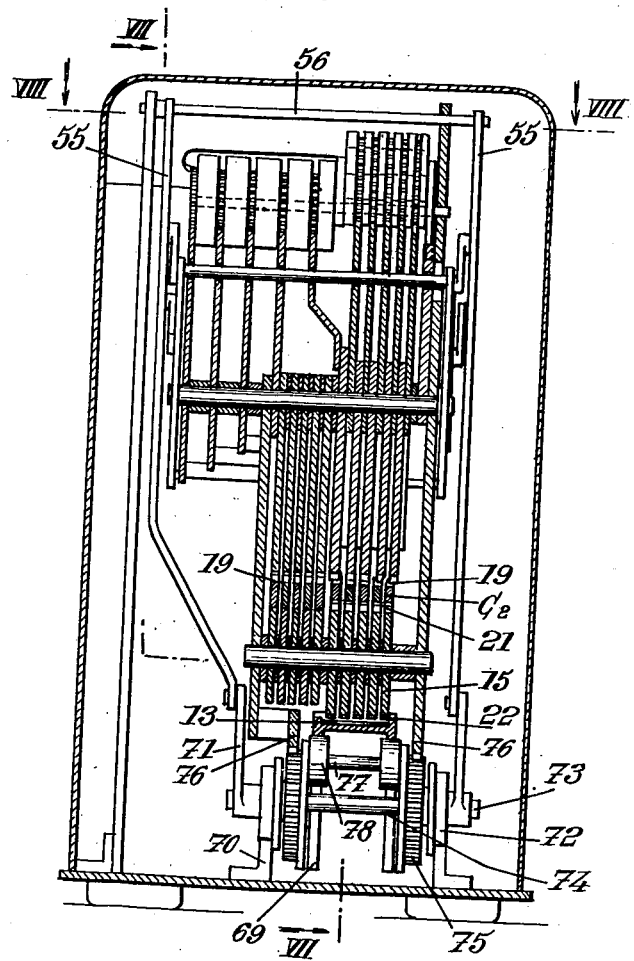
Figure 10:
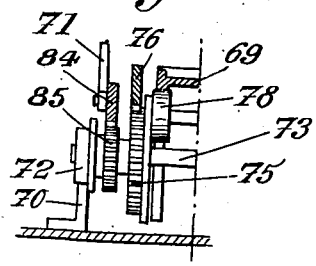

Preferred embodiments of my invention will be hereinafter described with reference to the accompanying drawings, given merely by way of example and in which:

Fig. 1 is a plan view of an operating block according to my invention,

Figs. 2, 3 and 4 show, respectively in side view, in end view and in plan view, an embodiment of the combination of the machine with the operating block according to my invention, Figs. 5 and 6 illustrate, respectively in end view and in cross section, a portion of an operating block according to another embodiment of my invention, Fig. 7 is a longitudinal section on the line VII—VII of Fig. 9, Fig. 8 is a horizontal section on the line VIII—VIII of Fig. 9, Fig. 9 is a vertical section on the line IX—IX of Fig. 7 and Fig. 10 shows, in transverse section, a modification of construction of the mechanism for moving the ticket support.

The machine illustrated by Figs. 7 to 9 is intended to deliver tickets the price of which may be a number of five figures so that the machine includes five price printing control parts $C_0$, $C_1$, $C_2$, $C_3$, $C_4$.

This machine is further arranged to record code indications, for instance four in number, for which purpose it includes four supplementary control parts $C_5$ to $C_8$. But this part of the machine has no relation with the present invention and will not be described.

By way of example, it will be supposed that the delivery of a ticket includes the following operations:

1. Extraction of a blank cardboard piece 13 (which is to constitute the ticket) from a magazine 14, for instance a vertical one;

2. Stamping of this blank, including, for instance, printing of the ticket price by means of a set of five printing drums 15, dry stamping at 16, printing of an identification mark by means of a device 17 and, finally, printing of the indications carried by printing plate 10 located under operating block 1;

3. Ejection of the ticket, for instance into a discharge gutter 18 (Fig. 8).

Printing of the price on the ticket is achieved by means of five printing drums 15 carrying printing characters 22 against which the ticket is applied.

The positioning of printing drums 15 is obtained by means of racks 20 meshing with the teeth 21 of said drums. Racks 20 are carried by control parts $C_0$, $C_1$, $C_2$, $C_3$, $C_4$ which are in the form of rods slidably guided in the machine frame.

Said slidable control parts $C_0$ to $C_4$ are urged by springs 24 toward the right as seen in Fig. 7.

The positions of each of these five control parts $C_0$ to $C_4$ is determined simultaneously by abutments 2 carried by an operating block 1 which is inserted by the operator into the machine by sliding said block toward the left of Fig. 7.

In the machine shown by the drawings, control parts $C_0$ to $C_4$ (and other control parts $C_5$ to $C_8$) carry upper racks 19. These racks, however cooperate with mechanisms with which the present invention is not concerned so that they will not be described in detail.

Machines are known which make use of operating blocks such as above described. In such machines, it was necessary to provide a different operating block for every ticket price.

Now, the price of a ticket depends upon several factors. As a rule, one of these factors is common to several tickets of different prices and will, therefore, be called a basic factor. For instance, all the tickets for travelling from a place A to a place B have in common a basic factor which is the distance. They will differ in price according to the value of another factor, called the "variable" factor, which is, for instance, the class. The respective prices of a first-class ticket, a second-class ticket and a third-class ticket for travelling from A to B are, of course, different, although they correspond to the same "basic" factor (the distance of travel).

In machines of the type above referred to, it was necessary to have three operating blocks for these three kinds of tickets.

The object of my invention is to reduce the number of operating blocks necessary to operate the machine, the same operating block being used for all tickets having in common the same "basic" factor.

Fig. 1 illustrates a first embodiment of my invention. The operating block 1 (for all tickets for travelling from a town A to a town B) carries a plate $1a$ provided with sets of abutments $2_0'$—$2_0''$—$2_0'''$, $2_1$—$2_1''$—$2_1'''$, $2_2'$—$2_2''$—$2_2'''$, $2_3'$—$2_3''$—$2_3'''$. Plate $1a$ is adjustable transversely with respect to operating block 1, so that only one group of abutments (comprising one abutment from each set) at a time can cooperate with control parts $C_0$, $C_1$, $C_2$, $C_3$. For instance, in the position shown by Fig. 1, the group of abutments in action will be $2_0''$, $2_1''$, $2_2''$, $2_3''$ (second-class tickets). By moving plate $1a$ transversely with respect to block 1, it is possible to bring into play either group $2_0'$, $2_1'$, $2_2'$, $2_3'$ (first-class tickets) or group $2_0'''$, $2_1'''$, $2_2'''$, $2_3'''$ (third-class tickets). In order to keep plate $1a$ in the desired positions, I provide, between block 1 and plate $1a$, resilient locking means comprising a spring-pressed ball 7 engaging notches of plate $1a$.

According to another embodiment, instead of displacing the sets of abutments transversely with respect to the operating block, I provide means for adjusting the control parts $C_0$, $C_1$, $C_2$ and $C_3$ to three positions transversely. For this purpose, for instance, as shown by Figs. 2, 3 and 4, I provide each control part, such as $C_0$, with a projection 8 adapted to pivot tranversely by means of, for example, a sliding plate 9 common to all these projections and adapted to be controlled from the outside of the machine. Each projection 8 can be brought into position to cooperate with any of three abutments on the operating block with which the control part is associated.

In order to provide a printing block which takes into account variations of two variable factors (for instance the class and a different reduction of price), I distribute the lines of abutment relatively to a control part as diagrammatically shown by Figs. 4 and 5, into several rows located at different levels, every row corresponding to one given reduction of price and every level to one class.

In this case, longitudinal orifices $2c$ are provided in block 1 and rods $2b$ having variable lengths are inserted in these orifices. As can be clearly seen in Fig. 5, the ends of these rods provide abutment means for the control parts.

The delivery mechanism includes a motor 50, which when started by means of a contactor 50a, actuates the device for conveying the ticket to the printing mechanism.

Motor 50 drives, through an endless screw 51, disc 52 which carries a crank pin 53 to which is pivoted one end of a connecting rod 54, the other end of which is pivoted with a pair of parallel arms 55. Arms 55 are pivoted at their upper ends to a fixed transverse spindle 56.

A ticket conveying carriage 69 driven by arms 55 is mounted to run on horizontal rails 70 disposed under the blank ticket magazine 14 and the stamping means (magazine 14, drum 15, dry stamp 16, drum 17 and plate 10).

This carriage in cross section is in the shape of an inverted U, the upper face of which carries, at the rear thereof, a projection 69a of a height slightly less than the thickness of a ticket. When the carriage starts from its position under ticket magazine 14 where ticket blanks are piled up, this projection serves to push forward the bottom blank ticket of the pile.

Carriage 69 is controlled by arms 55, through connecting rods 71 pivoted, at their upper ends, to the free ends of said arms 55 and supported at their other ends by coaxial rollers 72. Rollers 72 run on rails 70, and the axle 73 of these rollers is movable in horizontal slideways 74 provided in the side walls of said carriage.

Fixed on axle 73 (which is rigid with rollers 72) are two identical toothed pinions 75 meshing with two fixed horizontal racks 76 which are parallel to rails 70 and located above them.

I provide, parallel to axle 73, a transverse spindle 77 of an eccentricity equal to the primitive radius of pinions 75, said spindle (which is held by side members 75a rigid with said pinions) bearing two rollers 78 guided in vertical slideways 79 (of a width greater than that of horizontal slideways 74) provided in the side walls of carriage 69.

It will be readily understood that, with such a kinematic system, when carriage 69 is moving from left to right under the effect of the pendular movement of arms 55, spindle 77 and rollers 78 describe a cycloid while axle 73 moves in a horizontal slideway 74. If care has been taken to position the top of vertical slideways 79 slightly below the cusps of the cycloid described by the uppermost point of each of the rollers 75, these rollers, when they come close to the upper end of their upward movement, will lift the whole of carriage 69 (which is made possible at this time by the fact that axle 73 is then located in the portion of the horizontal slideways 74 crossed by vertical slideways 79) and will apply the ticket held by said carriage against the bottom of the ticket magazine or against the printing or stamping means.

Of course, it will be necessary for such a machine to include suitable devices for inking the printing means.

These devices may comprise, for instance, an inking tank with a roller 81 carried by carriage 69, which roller serves to ink the printing characters of the stamping means under which said carriage is moving.

On the other hand, means must be provided to eject the ticket at the end of the movement of carriage 69, which means may comprise, for instance a hook 82 adapted elastically to engage said ticket at the end of the outward stroke of the carriage and to retain it when said carriage starts on its return stroke. The ticket after engagement with hook 82 then drops, along an inclined plane 83, onto the outlet gutter 18.

The above described machine for delivering railway tickets works as follows:

When a customer asks the operator for a ticket of given characteristics (destination, class, etc.), the operator gets, from his collection of printing blocks, the one which corresponds to the type of ticket (destination) which is being asked for and he adjusts said printing block (or the positioning means) in accordance with the class and/or a possible reduction of price to which the customer may be entitled.

He then inserts the operating block into the machine.

The machine is ready to operate and the operator actuates contactor 50a and motor 50 starts working, driving arms 55 and all the mechanisms related therewith.

Due to the action of this mechanism, a blank cardboard piece 13 is extracted at the bottom of magazine 14 and successively applied against the stamping and printing means, and is finally ejected from the machine at 83.

Fig. 10 shows a modification of construction of the mechanism for operating carriage 69, which modification makes it possible to reduce the angular displacement of arms 55 while still obtaining the cycloidal shape of the path of travel of the ticket. According to this modification, the general mechanism is arranged to drive, for instance, through connecting rods 71, a movable rack 84 acting upon a pinion 85 coaxial with pinions 75 and rigid therewith, the diameter of this pinion 85 being different from (preferably lower than) that of pinion 75, whereby the displacement of said rack 84 drives carriage 69 as desired through a differential effect which multiplies the longitudinal displacements.

In a general manner, while I have, in the above description, disclosed what I deem to be practical and efficient embodiments of my invention, it should be well understood that I do not wish to be limited thereto as there might be changes made in the arrangement, disposition and form of the parts without departing from the principle of the present invention as comprehended within the scope of the accompanying claims.

What I claim is:

1. In a machine for delivering tickets on which is to be printed information dependent upon a basic factor and at least one variable, said machine comprising a frame, a plurality of printing members carried by said frame and having printing type mounted thereon, said printing members being movable to bring the desired type to printing position, a set of control parts movably carried by said frame, each for engaging one of said members to move said members, an operating block insertable in said machine, said operating block having sets of abutments thereon, the combination of an abutment from each set forming a group, a group of abutments adapted to cooperate with the control parts to move the printing members to a position corresponding to a given value of the basic factor and one value of the variable, and adjustable means for permitting the control parts to cooperate with selective groups of said abutments whereby the printing members may be positioned to represent the given value of the basic factor and selected values of the variable.

2. A device as described in claim 1, said operating block having a generally flat surface, said abutments projecting upwardly from the flat surface.

3. In a machine for delivering tickets on which is to be printed information dependent upon a basic factor and at least one variable, said machine comprising a frame, a plurality of printing members carried by said frame and having printing type mounted thereon, said printing members being movable to bring the desired type to printing position, a set of control parts movably carried by said frame, each for engaging one of said members to move said members, an operating block insertable in said machine, said block including a base and a plate movable transversely on said base, sets of abutments disposed on said plate, the combination of an abutment from each set forming a group, a group of abutments adapted to cooperate with the control parts to move the printing members to a position corresponding to a given value of the basic factor and one value of the variable, and means for fixing said plate in positions to permit the control parts to cooperate with selective groups of said abutments whereby the printing members may be positioned to represent the given value of the basic factor and selected values of the variable.

4. The combination recited in claim 1, said last-named means including movable extensions on said control parts and means for simultaneously shifting all of said movable extensions.

5. The combination recited in claim 1, said operating block having bores therein, and said abutments constituting rods inserted in said bores.

References Cited in the file of this patent

UNITED STATES PATENTS

| | | |
|---|---|---|
| 923,085 | Smith | May 25, 1909 |
| 1,737,878 | Gollnick | Dec. 23, 1929 |
| 1,818,338 | Kropf | Aug. 11, 1931 |
| 1,829,004 | Howard | Oct. 27, 1931 |
| 1,871,060 | Hoffman | Aug. 9, 1932 |
| 1,905,288 | Hoffman | Apr. 25, 1937 |
| 2,033,936 | Hoffman | Mar. 17, 1936 |

FOREIGN PATENTS

| | | |
|---|---|---|
| 37,982 | Norway | June 20, 1922 |